MULTI-CHANNEL DYNAMIC MEMORY SYSTEM FOR ANALOG SIGNALS

Filed Jan. 21, 1965 3 Sheets-Sheet 1

INVENTOR
STANLEY H. JURY

BY
Cushman, Darby & Cushman
ATTORNEYS

MULTI-CHANNEL DYNAMIC MEMORY SYSTEM FOR ANALOG SIGNALS

Filed Jan. 21, 1965 3 Sheets-Sheet 2

INVENTOR
STANLEY H. JURY

BY
Cushman, Darby & Cushman
ATTORNEYS

INVENTOR
STANLEY H. JURY

BY
Cushman, Darby & Cushman
ATTORNEYS

United States Patent Office 3,405,397
Patented Oct. 8, 1968

3,405,397

MULTI-CHANNEL DYNAMIC MEMORY SYSTEM FOR ANALOG SIGNALS

Stanley H. Jury, 6008 Kaywood Drive, Knoxville, Tenn. 37920

Filed Jan. 21, 1965, Ser. No. 426,920
14 Claims. (Cl. 340—173)

ABSTRACT OF THE DISCLOSURE

A dynamic analog memory wherein input information is first converted to a staircase replica of the analog function. Each step of the staircase is then time modulated and the resultant pulses trigger an oscillator to provide high frequency pulse bursts. These bursts are propagated along a delay line. If readout is desired, the delay line is tapped at a prescribed point, and the operations performed to develop the high frequency bursts are reversed so as to reconstruct the original analog function. If long term storage is desired, the delay line is tapped at another point. The pulse bursts in this case are converted to the form of the original triggering pulses, and these are fed back to the oscillator to cause recirculation of the stored information.

The present invention relates to an improved memory system and, more particularly, to a dynamic memory for use with an analog computer.

In association with analog computers there have been utilized in the past a number of memory arrangements. Some of these operate completely in the analog mode whereas others function by transferring analog functions from the analog computer into a digital computer memory via a communication link and retrieving the stored information therefrom by the same linkage. The latter type are called hybrid memories.

All of the memories of the past have serious disadvantages which the present invention overcomes. The hybrid arrangement involves large and costly communication links and requires an instruction program in order to store and retrieve information from the memory of the digital computer. The programming of instructions and their execution are extremely time consuming, and, of course, the use of a digital computer is costly.

Other known analog memories can be generally classified into three categories: continuous function storage, sample-hold or point storage, and continual function storage. Continuous function storage may be described as the injection of an analog function directly into a delay medium and retrieving it therefrom directly in analog form. Sample-hold or point storage involves the storing of a single sample point of a function. Continual function storage differs from continuous in that the function is operated or in some prescribed way both before and after transmission through the delay medium.

These presently known pure analog memories suffer from a number of disadvantages. Continuous function stores are low quality approximations to a delay medium due to rapid increase in equipment and cost to do any better or they are inherently slow and expensive electromechanical devices or they require continuous wave transmissions which are not self-sustaining with regard to fidelity during indefinite storage. The problem of fidelity is also present in point storage systems since it is difficult to accurately reproduce the analog function sampled. Continual function stores are deficient because of their relatively high cost per channel resulting from the coding employed in operating on the function and the amount of equipment required.

The principal object of the present invention is to provide an improved dynamic analog memory for faithfully storing analog information for any desired period of time, the memory being characterized by its sequential operation based on a built-in program requiring no other programming or execution time to thereby provide a memory which operates at high speed and which is compatible with the best quality analog computers.

Ancillary to the immediately preceding object, it is an object of the invention to provide a high speed repetitively operative memory which may be used in solution of systems of partial differential equations, in correlator applications, analog data analysis, transport delay applications, control operations, and the like.

A further object of the invention is to provide an analog memory capable of time multiplex operation at a low cost per channel with a low noise level.

An additional object of the invention is to provide an improved analog memory wherein stored information may be indefinitely recycled, the information being phase controlled and locked during recycle without interruption of the smooth flow of information.

A still further object is to provide an analog memory which is internal timed and synchronized with the external analog computer by means of a single timing source.

Another object of the invention is to provide an improved analog memory having reduced cross-talk, output pulses of minimum rise time and maximum signal-to-noise improvement.

A further object of the invention is to provide an analog memory incorporating an improved timing pulse selector therein to permit precision time demodulation in the memory.

A still further object of the invention is to provide a dynamic analog memory incorporating a variable delay feedback control to prevent jitter in control pulses and to compensate the memory for changing environmental conditions.

Another object of the invention is to provide a precise analog memory to thereby reduce the length of the delay line incorporated therein.

Further objects and the entire scope of the invention will become more fully apparent when considered in light of the following detailed description of illustrative embodiments of this invention and from the appended claims.

The illustrative embodiments may be best understood by reference to the accompanying drawings, wherein.

Briefly, the invention comprises a dynamic analog memory for use with an analog computer. In the preferred embodiment of the invention a pulse position modulation technique is employed. However, other types of pulse modulation may be utilized as will be pointed out hereinafter. The dynamic analog memory disclosed operates in multiple channels as a time multiplex arrangement. A summary of the operation of a single channel follows:

Analog input information for a particular channel enters the memory and is converted via a uniform sample-hold device to a staircase replica of the analog function and each step is time modulated, i.e. represented by a pulse which in its time position is proportional to the amplitude of the step. The video pulse train developed by modulating the steps of the staircase replica are applied through suitable logic to a coherent pulsed oscillator which provides a burst of high frequency pulses for each pulse applied thereto. These high frequency RF pulses are then propagated along an ultrasonic delay line. If the delayed analog signal is to be utilized in a readout operation, the RF pulses are taken from a tap prior to reaching the end of the delay line and are converted from their RF form back to the train of video pulses. These pulses are applied to a time demodulator which substantially reproduces the staircase replica, by first producing a non-uniform tread staircase and then a uniform tread replica, and operates on the uniform replica to convert the staircase back to a form essentially identical with the analog input. The entire delay line is not utilized in this case since there is some delay inherent in the additional circuitry. The delay line is tapped so that the total delay encountered between the input and output terminals is exactly that of the entire sonic delay line. If, however, it is desired to provide long term storage of information, the train of RF pulses is removed from the end of the ultrasonic delay line and is recirculated back to the input end thereof. This recirculation continues until it is desired to read the information out of the memory which is accomplished by the process heretofore described. Each recirculation cycle constitutes a storage of the analog information for a period of time substantially corresponding to the length of the ultrasonic delay line.

Figure 1:
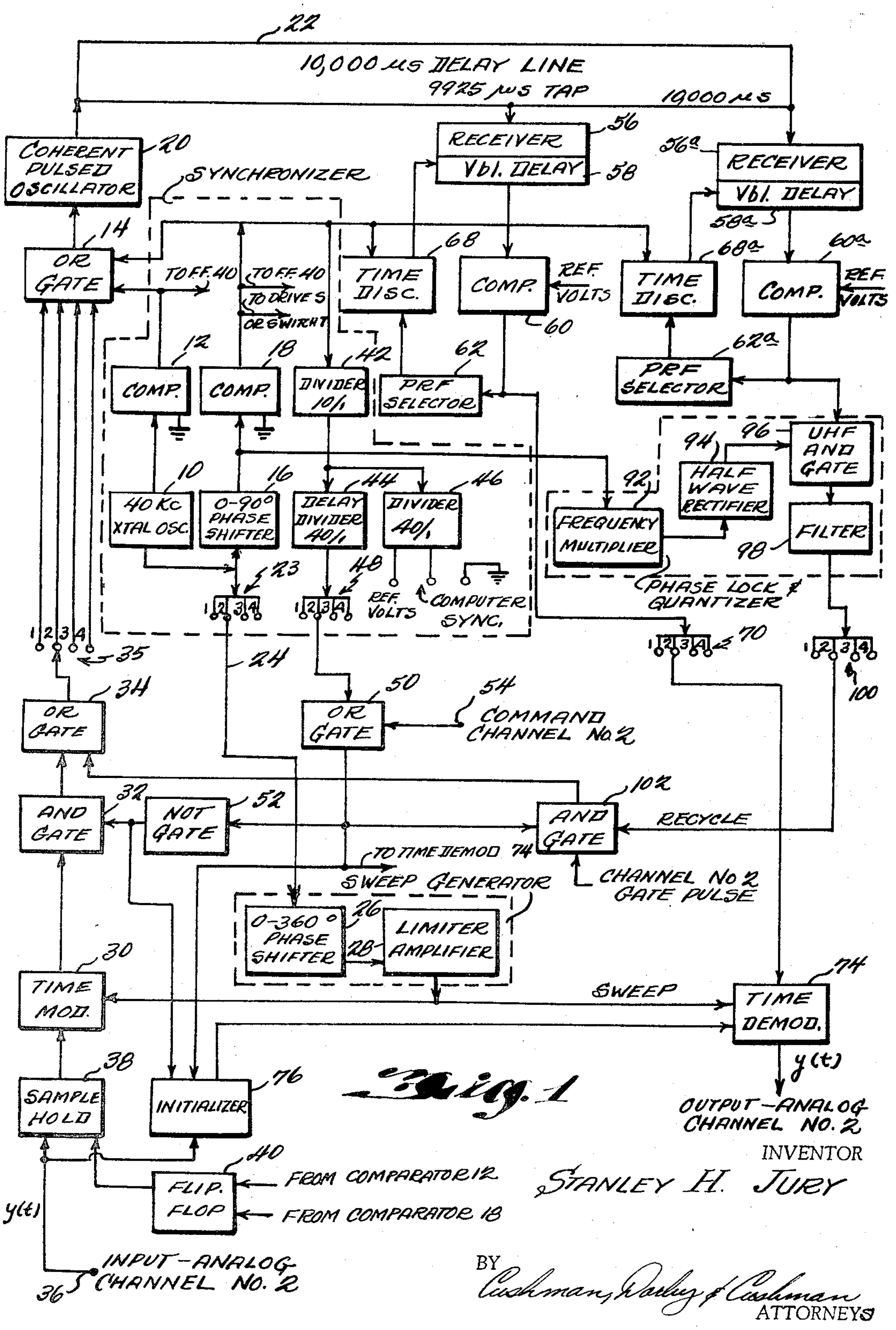
FIGURE 1 is a schematic block diagram of a preferred embodiment of the invention.

Now that the invention has been summarized, the details thereof will be set forth. In FIGURE 1, there is illustrated the arrangement required for one channel of a multichannel memory. It will become apparent from the description which follows that the several channels are sequentially sampled to provide a time multiplex arrangement whereby the train of pulses passing through a common ultrasonic delay line constitutes a sequential sampling of the several channels. The memory disclosed has been, for illustrative purposes, arranged to operate with an analog computer which computes for 10,000 microseconds and requires a reset of 10,000 microseconds before it can again compute. Consequently, a 10,000 microsecond delay line is employed.

The timing arrangement for the entire system is centered about a crystal oscillator 10 which serves as a source for synchronizing the operation of the analog computer and the memory. In the illustrative embodiment, this oscillator develops a signal of 40 kc. Thus, each cycle has a period of 25 microseconds. The oscillator 10 is connected as an input to a first amplitude comparator 12 which is referenced to ground potential. The output of comparator 12 is connected as one input to an OR gate 14. The output of the oscillator 10 is also connected as an input to a 0–90° phase shifter 16. The output of phase shifter 16 is connected as an input to a second amplitude comparator 18, also referenced to ground. The output of comparator 18 is connected as a second input to OR gate 14. Thus, for each cycle of operation of oscillator 10, a pair of pulses are applied to OR gate 14, these pulses being separated by a distance dependent on the setting of phase shifter 16. The oscillator 10, comparators 12 and 18, phase shifter 16 and the OR gate 14 are constructed in accordance with circuitry well known in the prior art. The parameters of comparators 12 and 18 are such that on the application of a signal from oscillator 10 thereto, an output pulse is developed which is 1 microsecond in duration. For purposes of the illustrative embodiment, phase shifter 16 is set to produce a 1 microsecond interval between the pulses applied respectively by comparators 12 and 18 to OR gate 14. Consequently, the output of the OR gate 14 comprises a pulse doublet having two 1 microsecond pulses separated by a 1 microsecond interval. The output of OR gate 14 is connected as an input to a coherent pulsed oscillator 20. Once again, the structure of this oscillator is well known in the prior art and does not, of itself, form part of the invention. This oscillator has the characteristic of developing a burst of pulses in response to an input pulse being applied thereto, the beginning of each burst starting at a "0" reference point with respect to ground. In the illustrative embodiment, oscillator 20 develops pulse bursts of 30 to 40 megacycles per second. The RF output of the coherent pulsed oscillator 20 is connected through suitable transducer means (not shown) to one end of an ultrasonic delay line 22. As stated previously, this delay line has a length of 10,000 microseconds.

The output of the 40 kc. crystal oscillator 10 is also applied to a plurality of terminals, generally indicated at 23. A terminal is provided for each channel. To each of these terminals there is connected similar circuitry for performing the multiplex operation. In FIGURE 1, only the circuitry utilized with channel 2 of the four channels employed in the illustrative embodiment is illustrated. To the terminal corresponding to channel 2, a line 24 is connected. Line 24 joins terminal 2 to the input of a 0–360° phase shifter 26. The output of the phase shifter 26 is connected to a limiter amplifier 28 which amplifies and clips the 40 kc. signal applied thereto. The combination of phase shifter 26 and amplifier 28 comprises a sweep generator which is indicated within the dash lines. As the individual elements which constitute the sweep generator are well known, they have not been described in detail. The output of amplifier 28 is applied as one input to a time modulator 30. This time modulator is essentially an amplitude comparator of conventional construction which responds only to the positive-going portion of the output of limiter amplifier 28. The output of the time modulator 30 is connected as an input to an AND gate 32. AND gate 32 has its output connected as an input to an OR gate 34. Gate 34 is connected at its output to the channel 2 terminal of a group of terminals generally indicated at 35. Each of the terminals 35 is connected to separate inputs to OR gate 14. Like terminals in group 35 are provided for the other channels. A memory input terminal 36 is connected to a sample-hold circuit 38, the output of which is applied to the time modulator 30. Terminal 36 serves as the input terminal for the analog channel No. 2. Consequently, the analog function appearing in channel 2, indicated generally as $y(t)$ is applied to the sample-hold circuit 38. The output of a flip-flop 40 is connected as a second input to the sample-hold circuit 38. Flip-flop 40 is controlled by the pulse doublet, or pulse repetition frequency (PRF) pulse pair, developed by the crystal oscillator 10 and comparators 12 and 18. The outputs of comparators 12 and 18 are connected respectively to the set and clear input lines of flip-flop 40. When the first pulse of the PRF doublet occurs, it drives flip-flop 40 into the set state, and when the last pulse occurs, the flip-flop is cleared. As suggested previously, the doublet comprises 1 microsecond pulses separated by a 1 microsecond interval. Consequently, the flip-flop 40 is set for substantially a 2 microsecond period. During this interval the sample-hold circuit 38 samples, or tracks, its analog input $y(t)$. When the flip-flop 40 is cleared, circuit 38 holds the last analog value applied thereto during tracking. This cycle is repeated on occurrence of the next PRF doublet. The net result is that the output of the sample-hold circuit 38 is a uniform tread staircase replica of the analog function $y(t)$. Each of the steps of the staircase is sampled at a prescribed time in accordance with the setting of the sweep generator. The actual sampling time of the steps is a function of the adjustment of the 0–360° phase shifter 26.

Figure 2:
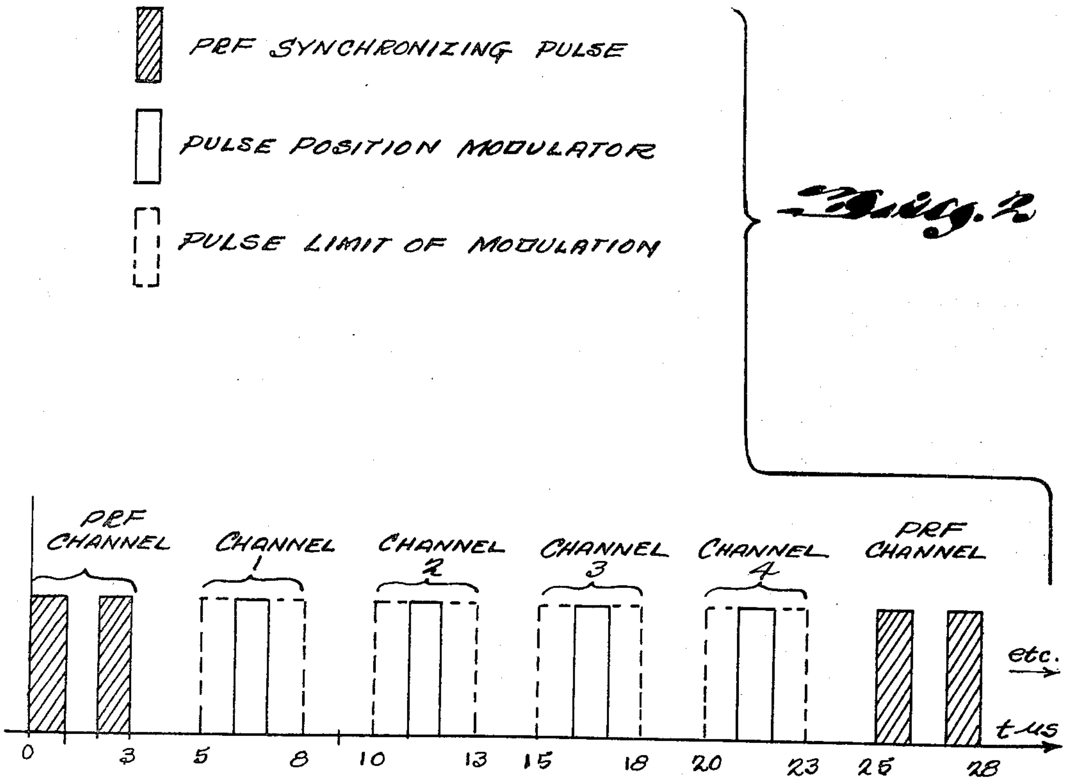
FIGURE 2 is a timing diagram indicating the time multiplex relationship between the synchronizing pulses and the four information channels employed in the preferred embodiment.

Turning for a moment to FIGURE 2, the relative arrangement of samplings in the multiplex system of the illustrative embodiment will be described. FIGURE 2 indicates a timing diagram of the signals which are passed by OR gate 14. As stated previously, a pulse doublet is established by suitable circuitry, the doublet comprising two 1 microsecond pulses spaced by a 1 microsecond interval. This doublet is placed in what is called a PRF channel having a total duration of 3 microseconds. Since a 40 kc. oscillator is used as the central timing source, the next pulse doublet is developed 25 microseconds after the first doublet. Referencing the first doublet at time "0," the next doublet begins at the 25 microsecond point in FIGURE 2. The illustrative embodiment is a four information channel and single PRF channel multiplex system. In order to prevent overlapping of pulses in the PRF and information channels, a suitable spacing is provided between each channel. In the illustrative embodiment this has been established as a 2 microsecond separation with each information channel being permitted a width of 3 microseconds. Consequently, channel 1 lies in the 5–8 microsecond range, channel 2 in the 10–13 microsecond range, channel 3 in the 15–18 microsecond range, and channel 4 in the range from 20–23 microseconds. The illustrative embodiment employs a pulse position modulation arrangement for the pulses in each channel. Consequently, the pulses for each of the information channels will vary within the limits of its respective channel.

Based on the foregoing, it will be apparent that in the channel 2 arrangement illustrated in FIGURE 1, the 0–360° phase shifter 26 is set to develop a sweep which is related to the pulse doublet of the PRF channel so that a signal developed at the output of time modulator 30 will appear within the range of channel 2. Similarly, the sweep generators of the remaining channels are also set to sweep at a time appropriate to their respective channels. It should be pointed out that the phase shifters 26 of the sweep generator of each channel are set so that the sweep is oriented with respect to the leading edge of the channel pulse such that the sweep voltage passes through ground potential in a negative-to-positive direction at a particular time. For channel 2, this is at 11 microseconds.

During the sweep function, the amplitude of the increasing sweep voltage is compared at the time modulator 30 with the amplitude of the output of the sample-hold circuit 38. When these amplitudes coincide, modulator 30 develops a pulse which is applied to AND gate 32. It is apparent, therefore, that the time position of the pulse developed by modulator 30 is proportional to the amplitude of the step applied by the sample-hold circuit 38. Consequently, the output of modulator 30 is a pulse having a modulated time position. Thus, the system of the illustrative embodiment is one of pulse position modulation (PPM) with the pulse position being a function of amplitude of the analog input.

The output of amplitude comparator 18 is connected through a ten-to-one divider 42. The output of divider 42 is connected to the inputs of a pair of dividers 44 and 46. These dividers have a forty-to-one ratio and divider 44 includes a delay. The output of delay divider 44 is joined to a set of four terminals, indicated generally at 48. For channel 2, the second of these terminals is connected to the input of an OR gate 50. The output of gate 50 is connected to the input of a NOT gate 52, the output of gate 52 being joined to a second input of AND gate 32. The structure of dividers 42, 44 and 46, OR gate 50, and the NOT gate 52 are well known in the prior art and do not constitute a part of the invention.

The NOT gate 52 operates in accordance with standard gates of this type in that the application of the input at one level produces an output at a second level and vice-versa. Accordingly, when there is no input to gate 52, an output appears which is applied to AND gate 32 to thereby condition it.

Dividers 44 and 46 operate to reduce the 40 kc. signal from oscillator 10 to a frequency of 100 pips per second. The dividers 44 and 46 include conventional Phantastron, multivibrator and logic circuitry arranged in a manner to produce trains of 10,000 microsecond pulses separated by 10,000 microsecond intervals. These pulse trains are used for computer synchronization and internal memory synchronizing. The pulse train from divider 46 is appropriately applied to the computer to control its 10,000 microsecond compute cycle and its 10,000 microsecond reset period. Divider 44 attends to the internal synchronization of the memory with the computer as will now be described.

As a second input to OR gate 50 a command signal is provided through terminal 54. This command signal is supplied by the computer starting at the end of a compute cycle within which the computer determined that the stored analog function should be recycled and no new information should enter the memory. Recycle due to command continues until during a subsequent reset period the computer removes the command signal.

Assuming that during a computation cycle storage of the analog function is desired, no command input is applied to OR gate 50 and there is no input from divider 44. Consequently, gate 50 does not apply a pulse to NOT gate 52. Thus gate 52 delivers a signal to AND gate 32 thereby conditioning it to pass the modulated output of the time modulator 30. At the end of the 10,000 microsecond computing cycle, a pulse voltage is applied by divider 44 to OR gate 50 through terminal 48. This pulse of 10,000 microsecond duration is passed by gate 50 to the NOT gate 52. The output of gate 52 thereby reverses to close AND gate 32 during the 10,000 microsecond reset period. Of course, if no storage is desired, the command input on terminal 54 serves to close gate 32 in the manner just described.

As stated previously, the output of divider 44 is delayed with respect to that of divider 46. The selected delay in divider 44 compensates for any delay in the computer switches during changes between compute and reset operation. Since both the computer and the memory are supplied with a timing pulse generated by a single source, oscillator 10, it is apparent that inphase compatibility between the memory and the computer is achieved.

Of course, it will be appreciated that if the computer switches substantially instantaneously, there is no requirement for a delay in divider 44 and a single divider could be employed to synchronize both the computer and the memory.

As stated in the foregoing discussion, a PRF pulse doublet is developed which is applied to the delay line 22 followed by sequential samplings of the analog functions appearing in the various information channels. These signals are in the form of distinct RF pulse bursts in accordance with the action of the coherent pulse oscillator 20. The resultant pulse train propagated along the delay line may be utilized in two ways upon extraction from the delay line. If a readout is desired, the pulse train is tapped at a point along the delay line whereas storage of the pulse trains for long periods requires their being tapped from the end of the line. The arrangement and reasoning of each of these possibilities will now be described.

In the case of a readout, a suitable transducer means (not shown) is provided at the 9925 microsecond tap position of delay line 22. The output from the delay line is applied to a suitable receiver of conventional construction which transforms the RF signals developed by oscillator 20 back into the form of video pulses. This receiver is indicated at 56. The output of receiver 56 is applied through a variable delay line 58 to an amplitude comparator 60 to which is also applied a reference voltage. The purpose of comparator 60 is to compare the amplitude of the video pulse with the reference voltage to thereby correct distortion which may have occurred to the signal during propagation through the delay line. Such distortion may be caused by noise, spurious pulses, etc.

In the present system, the pulses developed by the coherent oscillator 20 and propagated along the delay line 22 have an envelope with a steep slope. Accordingly, the noise and spurious signals in the delay line have minimum effect on the time displacement or voltage level of the pulses. The reference voltage at the comparator 60 is appropriately selected so that when the leading timing edge of the video pulse from the receiver reaches the selected voltage level, the comparator fires to generate a new pulse. The signal-to-noise improvement is related to the slope at the firing level.

Cross-talk is, on the other hand, related to the frequency spectrum of the pulse and that of the transmission pass band. It is a well known fact that square pulses injected into a delay medium tend to come out of the delay medium with tails on them that can interfere with other pulses in the pulse train and thus cause cross-talk.

It can be shown by means of Fourier transforms that the Gaussian shaped pulse is highly desirable in the present memory since the frequency spectrum of it can be matched with that of the delay medium pass band which can also be tailored to the Gaussian shape. By doing so, cross-talk is minimized since by matching the spectra, the tails are eliminated.

As a consequence of the foregoing requirements, the coherent pulsed oscillator 20 includes a special filter (not shown) such that the oscillator is turned on and off in Gaussian fashion even though the filter and oscillator are activated by a square or trapezoidal pulse. Such filters are known in the prior art and do not constitute a part of the invention.

The comparator 60 at the output of receiver 56 must convert the Gaussian pulse back to the square or trapezoidal form since the latter is necessary in the precise operation of the time demodulator to be hereinafter described in detail.

Although the Gaussian shape is preferred, the only basic requirement for transmission is the matching of frequency spectra.

In fulfilling the foregoing requirements, conventional filter and comparator design techniques may be employed.

Figure 3:
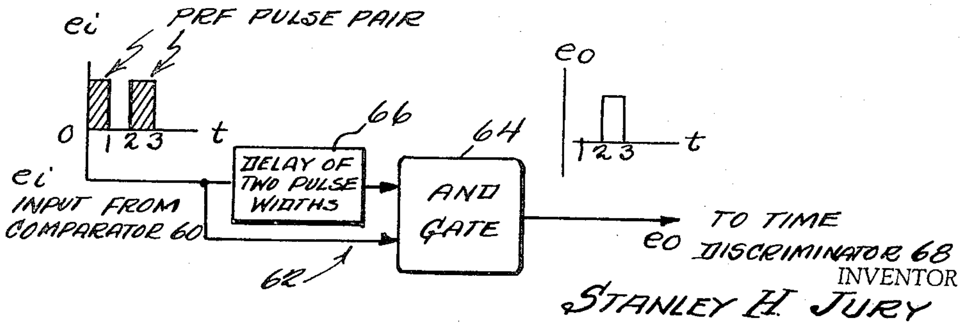
FIGURE 3 is a block diagram of a timing pulse selector used in controlling the internal timing of the memory.

The output of comparator 60 is applied as an input to a PRF selector 62. This selector is shown in FIGURE 3 of the drawings and comprises an AND gate 64 having two inputs thereto. The first input is the signal as it appears at the output of comparator 60. The second input is the output of the delay line 66 to which the output from comparator 60 is applied. Delay line 66 has a delay of two pulse widths. Consequently, when the pulse doublet is applied to the PRF selector, AND gate 64 is conditioned during the period when the second pulse of the doublet is directly applied to the AND gate. The output of AND gate 64 is connected as one input to a time discriminator 68 (see FIGURE 1). To discriminator 68 there is also connected the output of amplitude comparator 18. The inputs to the time discriminator 68 are compared. Since the discriminator 68 is a conventional phase detector, any discrepancies in phase between the inputs results in a DC voltage being generated by discriminator 68. This voltage is applied as a control signal to the variable delay line 58 to thereby change the total delay between the input to delay line 22 and the input to comparator 60. By means of this variable delay line, any changes occurring in line 22 by ambient conditions which might vary its actual delay are compensated. Consequently, the utilization of the variable delay line 58 insures that the total delay remains at 9925 microseconds. This relationship between the output of comparator 18 and the input from the PRF selector 62 is valid since the total delay is a multiple of the twenty-five microsecond pulse repetition frequency.

The delay element 58 has been described as a delay line. However, it will be appreciated that other suitable delay devices may be employed. For example, since the leading edge of the video pulse out of the receiver has a slope, the variable delay may be an amplitude comparator the reference level of which is varied by the generated DC drive voltage.

No matter how nearly perfect the system is, there is always a residual time jitter in the PRF pulses. Thus, the feedback control circuit controlling the variable part of the delay line delay time must be designed with a time constant sufficient to smooth out the residual jitter in PRF pulses. If this is not done the feedback control will respond to the jitter and perpetuate the effect as a kind of time modulation on the output from the comparator following the receiver thus producing an undesirable effect by way of fidelity in the demodulated output from the memory.

By the foregoing arrangement, the output of the comparator 60 is maintained at a constant delay with respect to the input to the delay line 22. The output from comparator 60 is also applied to a group of terminals designated generally at 70. Once again, this terminal group includes a single terminal for each channel. The channel 2 terminal is connected to a time demodulator 74 to which the sweep developed by the previously described sweep generator is also applied. The time demodulator 74 also has a third input applied thereto. This input constitutes the output of an initializer 76.

Figure 4:
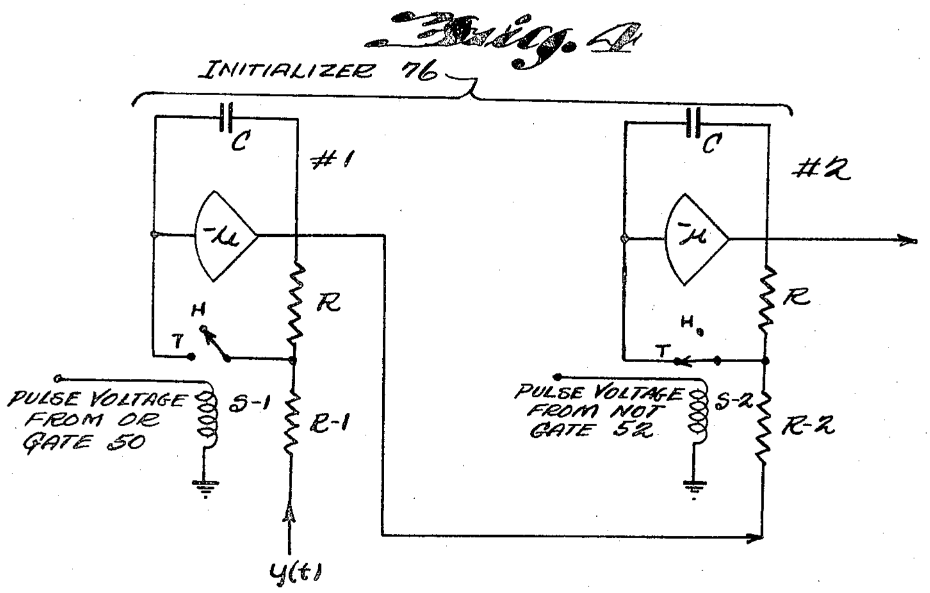
FIGURE 4 is a block diagram of an initializer used to establish a reference level for a time demodulator.

The initializer 76 is shown in FIGURE 4 of the drawings. The initializer comprises a pair of sample or track-hold integrators connected as point memories designated #1 and #2. Each integrator comprises a condenser C in parallel with an operational amplifier. Also in parallel with each amplifier is a series circuit including a resistance R and the movable contact of relay, the resistor being joined directly at one end to its amplifier output. For the point memory #1, the relay is indicated generally as S-1 while for point memory #2 the relay designation is S–2. The coil of relay S–1 is connected to the output of OR gate 50, and the coil of S–2 is connected to the output of NOT gate 52. The analog function $y(t)$ is connected through a resistor R–1 to the series junction of resistor R and the contact associated with relay S–1. The output of the amplifier of point memory #1 is connected through a resistor R–2 to the junction of resistor R and the contact associated with relay S–2. The output of the initializer is taken from the amplifier output of point memory #2.

Now that the structure of initializer 76 has been described, its operation will be set forth. As stated previously, during the reset cycle a 10,000 microsecond pulse is generated by divider 44 which is passed by OR gate 50. Similarly during long term storage the command pulse on terminal 54 is passed by gate 50. Either of these pulses drives the coil of relay S–1 to move its associated contact to the track (T) position. The output of point memory #1 then tracks its input $y(t)$. During this time there is no output from NOT gate 52 so relay S–2 is deenergized. Consequently, its contact is open in the hold (H) position. The point memory #2 thereby holds its output.

During the computation cycle, the situation just described is reversed. More specifically, OR gate 50 does not produce an output pulse since there are no pulse applied thereto from divider 44 and from the computer via terminal 54. Consequently, the contact associated with relay S–1 opens to the hold position while the contact of S–2 closes to track the output of point memory #1. The latter, which was tracking its input during reset or long term storage, now holds at its output the initial value of the new function being stored. Point memory #2 is now tracking this same initial value, and since it is constant, the output of point memory #2 is constant.

Figure 5:
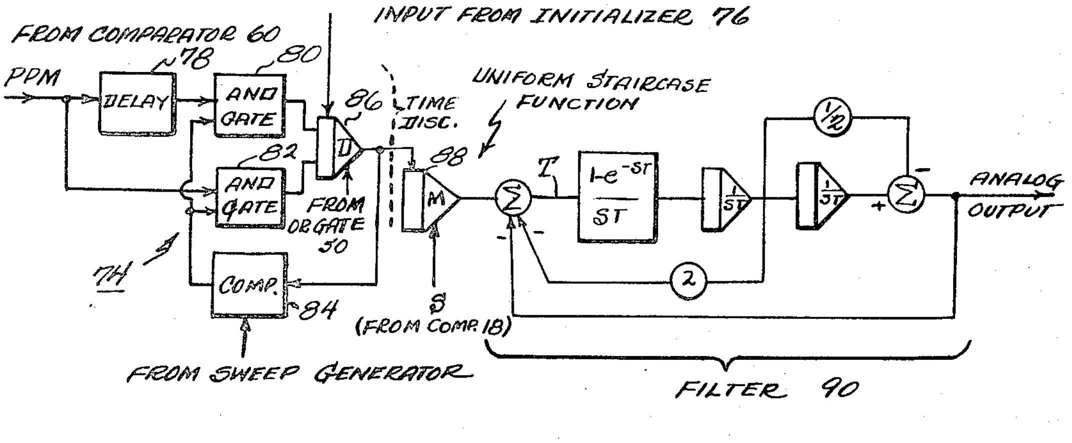
FIGURE 5 is a block diagram of a time demodulator and second order interpolative filter used to reproduce the analog function.

The purpose of initializer 76 will now be apparent when considering the details of the time demodulator itself which will be described with reference to FIGURE 5.

The time demodulator 74 comprises a delay line 78 to which the output from comparator 60 is applied. The output of delay line 78 is connected as one input to an AND gate 80. The output of comparator 60 is also directly applied to a second AND gate 82. As second inputs to AND gates 80 and 82, respectively, the output of a comparator 84 is connected. Comparator 84 has as inputs the output of the sweep generator and the output of a differential integrator 86.

Integrator 86 is a conventional arrangement provided with a plurality of inputs and capable of integrating in opposite directions. One of the inputs to the integrator is the output of initializer 76. The remainder include the outputs of AND gates 80 and 82 and the output of OR gate 50. The latter serves to control the initializing and differential integration functions of 86 in a manner well known in the art of analog computation. More specifically, during reset or long term storage gate 50 energizes a relay coil similar to that in point memory #1 to close its associated switch causing the integrator 86 to track the output of point memory #2 of the initializer 76. The latter output is the initial value of the function stored in the memory. Integrator 86 differs from point memory #1 in that a second but reverse acting relay disconnects the inputs derived from the outputs of AND gates 80 and 82 while 86 tracks. During the computations when there is no input from OR gate 50, the integrator switches reverse positions so that tracking ceases and with the normal inputs to 86 connected, integration commences at a voltage level corresponding to the output of the initializer 76. Thus, the initializer serves to establish a frame of reference for the integrating operation.

Based on the foregoing it is apparent that the output of the integrator 86 is fed back through the comparator 84 to the AND gates 80 and 82, the feedback being controlled by the output of the sweep generator.

The delay line 78 has a delay of one pulse width. Consequently, the video pulse applied to the time demodulator is first directed to AND gate 82 and then to AND gate 80. When the reference voltage appearing at the output of integrator 86 is equalized by the positive going sweep voltage, which voltage, it will be recalled, is adjusted by phase shifter 26 to center with respect to channel 2, an output signal is developed by comparator 84 which is applied simultaneously to the AND gates 80 and 82. If, at that time, AND gate 80 is conditioned, the integrator 86 integrates the input in one direction whereas when AND gate 82 is conditioned, the integrator operates to integrate in the opposite direction. When the video pulse from comparator 60 terminates, both AND gates close, AND gate 82 closing one pulse period before gate 80, to shut out noise until the next sample arrives from comparator 60. Until this sample appears, the integrator 86 holds its newly developed output voltage.

The output of integrator 86 is a staircase function having a riser portion each time a modulated pulse is applied to the demodulator. Due to the modulation, the risers are not uniformly spaced, and therefore, the treads are of unequal lengths. This could produce distortion in the analog output $y(t)$. Consequently, means are provided in the demodulator to develop a uniform staircase function which is similar to that appearing at the output of the sample-hold circuit 38. One method of accomplishing this is by coupling the output of integrator 86 to a conventional point memory 88 (similar to those shown in FIGURE 4) which is driven by a suitable memory drive S. The memory drive signal is generated under the control of the output from comparator 18. More specifically, the output of integrator 86 is a tread at the time that the delayed PRF pulse is produced by comparator 18. Since it is desired that point memory 18 track the integrator output during this period, the delayed PRF pulse triggers a suitable monostable multivibrator (not shown) which has a time constant consistent with the interval between the delayed PRF pulse and the early edge of the channel in question. The point memory thus tracks a constant integrator output during this period. When the multivibrator releases, the point memory 88 holds this constant value until the next delayed PRF again triggers the multivibrator. By this time, the output level of the integrator has shifted to a new constant level in accordance with the modulation. Consequently, the point memory tracks the new level. From the foregoing it will be appreciated that the output of the point memory is a staircase having uniform tread lengths, the amplitude of the treads being a function of the modulation.

In a number of applications where high precision is not required, the output of point memory 88 may be used directly. However, for the purpose of illustrating a more precise arrangement, the illustrative embodiment discloses the use of a filter to reproduce the analog function from the staircase function. The particular precision filter illustrated is a second order filter based on an article by J. D. Brulé appearing in "IRE Transactions on Automatic Control," AC–7, pp. 76 and 77 (January 1962). The elements of the filter disclosed are as follows:

$\Sigma$ = summing junction.

$T$ = switch which is closed once each PRF interval by the delayed PRF pulse from comparator 18 to sample its input.

$\frac{1-e^{-ST}}{ST}$ = conventional "box car" hold circuit.

$\frac{1}{ST}$ = integrator with RC time constant equal to T.

The circles enclosing a number are potentiometers or potentiometers plus amplifiers set to yield a gain equal to the number enclosed in the circle.

When a precision filter is employed, the point memory 88 is not required and the output of integrator 86 may be applied directly to the summing junction of the filter. In this case the staircase is made uniform by the sample switch and "box car" hold circuit of the filter.

It should be appreciated that the filter 90 may be of any suitable order in accordance with the precision required of the overall memory. However, as different order filters are employed, the tapping point of the delay line must be selected to account for the delay introduced by the particular type of filter used.

As stated previously, when information is to be demodulated by the demodulator 74, the information is withdrawn from delay line 22 at the 9925 microsecond tap. The 9925 microsecond point is less than 10,000 microseconds by three sample intervals of 25 microseconds each at a sample rate of 40 kc. Two units of delay are due to the second order filter 90 and one is due to the combination of sample-hold input and the portion of the demodulator circuit which converts the pulse position modulated information to the uniform staircase function. The latter introduces the unique effect of converting the signal frequency spectra so that higher order spectra can be successfully filtered from the desired first order spectrum. If other order filters are employed, the delay line tapping point must be changed to compensate for the change in filter delay.

In the event that long term storage or reset recycling is desired, the pulse train propagated through the delay line 22 is detected by a transducer (not shown) positioned at the end of the delay line and applied to a receiver 56$a$. Just as in the case of the signal detected at the 9925 microsecond tap, this pulse train is passed through the receiver and a variable delay 58$a$ to a comparator 60$a$ also having a reference voltage to eliminate noise. The output of the comparator is passed through a PRF selector 62$a$ to a time discriminator 68$a$ to which is also applied the output of comparator 18. By a similar operation to that described previously, the time discriminator develops a DC control voltage to vary the magnitude of the variable delay 58$a$ to thereby insure that the total delay of the recirculating path, to be hereinafter described in detail, is 10,000 microseconds. Of course, this can only be accomplished by matching the delay of PRF selector 62a to that of the recirculating path itself.

During propagation of a signal through the delay line, the individual pulses tend to broaden, thus tending to shift the leading edge of the pulse in the time domain. Noise and spurious pulses also tend to affect the leading timing edge position in the time domain. Although amplitude comparator 60a restricts the broadening process which is aggravated by recycle, it does not restrict the shift in time position of the leading edge of the pulse and long term storage could destroy or seriously degrade the fidelity of the stored signal. To overcome this, it is necessary to restrict or confine the shift in the time domain of the leading edge of the pulse which may have occurred during passage through the delay line. This is accomplished by a phase lock and quantizer arrangement indicated by the arrangement within the dash lines of FIGURE 1. The quantizer includes a frequency multiplier 92 having its input connected to the output of phase shifter 16. Since the leading edge of the pulses propagated through the delay line will have some residual timing error or jitter due to noise in the system, the frequency of the multiplier 92 must be related to the maximum error or jitter. This relationship is that for square pulses the period of the output frequency of the multiplier must be at least four times the maximum timing or jitter error. The frequency multiplier selected for the present embodiment is of standard design and produces an output having a frequency of $5 \times 10^3$ megacycles per second. This waveform is applied to a half-wave rectifier 94 to produce a train of ultrahigh frequency pulses applied to a UHF AND gate 96. These pulses may be squared, if desired, by including a clipper in rectifier 94. The output of comparator 60a is also applied to AND gate 96. Consequently, since the intervals between successive UHF pulses is only $0.1 \times 10^{-3}$ microseconds, the output of comparator 60a is trimmed at its leading edge and/or shifted in phase, depending on whether the start of the video pulse lies between two UHF pulses or on one of them, by the conditioning of the AND gate 96 to produce a locked signal with the phase shift of the leading pulse edge confined to a tolerable amount. The output of AND gate 96 is passed through a filter 98 to remove the UHF component of the AND gate output. If the video pulses are trapezoidal instead of square, then the phase of the pulse from the filter 98 will be shifted compared to the input video pulse. The phase shift depends on whether the trapezoidal pulse starts on or between the UHF gating pulses.

In accordance with the foregoing, a phase locked pulse is applied to a set of terminals indicated generally at 100. This terminal set includes one terminal for each channel. The output appearing on channel 2 terminal is connected as an input to AND gate 102. Also applied to gate 102 is the output of OR gate 50. As stated previously, a pulse is passed by OR gate 50 from divider 44 only during the reset cycle and from the computer by means of a command signal applied to terminal 54 whenever recycle of the stored function is desired. The presence of a pulse output from gate 50 partially conditions gate 102. In order to completely condition AND gate 102 to pass the stored information, a channel No. 2 gating pulse is required. This pulse is applied as third input to gate 102 and may be developed by a number of arrangements. For example, a chain of one shot multivibrators may be provided which are driven by the output of phase shifter 16. A pulse from this phase shifter fires the first multivibrator of the chain to produce a channel No. 1 gating pulse. This pulse fires the second multivibrator of the chain to produce the channel No. 2 gating pulse, etc. Based on the foregoing, it is apparent that gate 102 can be conditioned only during reset or whenever long term storage is desired to permit the output of filter 98 to pass through the AND gate 102 to an input of OR gate 34 to thereby complete the recirculation path of the sampled pulse. The number of recirculation cycles in long term storage is dictated by the channel No. 2 command generated by the analog computer. It is apparent that by simultaneous application of a channel command signal to terminal 54 and a channel gate pulse to gate 102, readout via the path through demodulator 74 and long term storage through the recirculation path is concurrently achieved.

In designing the foregoing recirculation path, another consideration is that the time delay based on the second pulse of the PRF doublet and measured across the PRF selector 62a must equal the maximum timing or jitter error which can be tolerated. To achieve this suitable delay compensation must be introduced into the system. This is necessary to prevent timing errors from accumulating to impair the fidelity of the stored information.

As stated previously, the system described employs four channels. However, it is apparent that the arrangement may be modified to accommodate a larger or smaller number of channels. If the former is desired, additional delay lines may be employed, the elements of FIGURE 1 enclosed by dash lines being capable of use with more than one delay line.

The foregoing describes a preferred embodiment of the invention. However, a number of alternative arrangements are also contemplated.

Instead of employing a 40 kc. sample rate, other sample rates may also be used. However, there is an intimate relation between sample rate, order of filter, number of channels and fidelity of analog information reproduction and this must be taken into account in utilizing alternative rates.

Other variations of the phase lock idea include the use of the video pulse to initiate a 5000 megacycle wave, the phase of which can be compared with that from the multiplier. The phase difference can be used to shift the phase of the video pulse and thus lock the video pulse in phase space.

Still another variation involves feeding the UHF gate 96 output into a regenerative amplitude comparator, the reference voltage of which is set at some intermediate level. The serrations on the sloping edge of a trapezoidal envelope pulse will cause the regenerated pulse to be shifted in phase depending on whether the reference voltage level falls at an interval between UHF pulses or thereon.

The illustrative embodiment has been described as a pulse position modulation arrangement. However, the invention also contemplates a pulse code modulation system. This is achieved by substituting an analog-to-digital converter for the time modulator 30, a digital-to-analog converter for the portion of the time demodulator 74 ahead of the filter 90, and an amplitude comparator for the limiter amplifier 28. The phase lock frequency from multiplier 92 could be reduced if desired so that the pulse width of the pulses from rectifier 94 corresponds to the desired pulse width in the mainstream flowing through gate 96 and filter 98 to terminals 100. Suitable means would be used in distinguishing the timing pulses from the information output of the digital-to-analog converter.

The described memory may also be adapted to a transport delay by interrupting the signal between NOT gate 52 and AND gate 32 by the addition of appropriate counters and logic gates so that a function $y(t)$ which extends over more than 10,000 microseconds can be stored in a given channel. During storage, AND gate 102 would be conditioned so that recycle is also possible. During readout of this delayed function, similar counting equipment and logic would precede time demodulator 74 to insure that the proper sequence of pulses entered the demodulator. Readout could be on the same time base, or faster or slower than the original time base, as desired. Such changes in time base have advantages in special application of the memory.

Another variation which is possible utilizing the basic arrangement of the preferred embodiment is to equip dividers 44 and 46 with standard gating devices so that certain pulses of the 100 pips per second produced thereby may be omitted thus generating 10,000 microsecond reset pulses spaced by intervals which are a multiple of 10,000 microseconds. This permits the computer to compute for a multiple of 10,000 microseconds and thus to compute at lower repetitive operation speeds. In this event the analog function from the computer, $y(t)$, of 20,000 microseconds, 30,000 microseconds, etc., would be stored in more than one channel. An additional logic arrangement, in a form conventional to one skilled in the art, would be utilized so that, for example, the first 10,000 microseconds of the function would be stored in channel 1, the second 10,000 microseconds in channel 2, etc. Of course, readout would be similarly instrumented.

The invention has been described as utilizing ultrasonic delay lines since these are presently the best type available for use with contemporary analog computers. However, as the computer art improves, analog computers may become available which operate at much higher repetitive operation speeds. In such a case, the delay line used in the memory could be made shorter. If this delay time becomes short enough, it is conceivable that an electromagnetic delay line, or some other type, may be substituted for the ultrasonic delay line.

The above-described embodiments are not intended to limit the possibilities of insuring the features of a low cost, high speed, precision dynamic analog memory. The memories disclosed have been associated with analog computers, but it will be apparent that the memory and its components are useful in other environments. The analog memories disclosed herein are examples of arrangements in which the inventive features of this disclosure may be utilized, and it will become apparent to one skilled in the art that certain modifications may be made within the spirit of the invention as defined by the appended claims.

What is claimed is:

1. A dynamic analog memory comprising: an input to which an analog signal is applied from an external source, means joined to said input for modulating said analog signal as a function of its amplitude, a delay line, first connecting means joining said modulation means to said delay line to permit propagation of the modulated signal through said line, demodulating means for reproducing said analog signal from the modulated signal, second connecting means joining a first chosen point along said delay line to the demodulating means after said modulated signal has been propagated through said line for a predetermined time, third connecting means selectively operable to join a second chosen point along said delay line and said first connecting means to thereby permit recycling of the modulated signal through said delay line, and timing means within said memory and connected to the external source for controlling the operation of said memory and synchronizing the memory with said source.

2. A dynamic analog memory as set forth in claim 1 wherein the analog signal is time modulated by said modulated means.

3. A dynamic analog memory comprising: an input to which an analog signal is applied from an external source, sampling means joined to said input for selectively sampling said analog signal, modulating means connected to said sampling means for modulating the sampled analog signal as a function of its amplitude, a delay line, first connecting means joining said modulation means to said delay line to permit propagation of the modulated signal through said line, demodulating means for reproducing said analog signal from the modulated signal, second connecting means joining a first chosen point along said delay line to the demodulating means after said modulated signal has been propagated through said line for a predetermined time, third connecting means selectively operable to join a second chosen point along said delay line and said first connecting means to thereby permit recycling of the modulated signal through said delay line, and timing means within said memory and connected to the exteral source for controlling the operation of said memory and synchronizing the memory with said source.

4. A dynamic analog memory as set forth in claim 3 wherein said timing means includes a pulse source, a sweep generator and means joining the output of said pulse source to the swep generator to control the operation thereof, and means joining the output of the sweep generator to said modulating and demodulating means to synchronize the operation thereof.

5. A dynamic analog memory as set forth in claim 3 wherein said third connecting means includees a gating means, said timing means including a pulse source joined as an input to said gating means to condition said gating means thereby phase locking the modulated signal recycled through said third connecting means.

6. A dynamic analog memory as set forth in claim 3 wherein said timing means includes a pulse source, means joining the output of said pulse source to said first connecting means to apply pulse repetition frequency pulses thereto, additional means joining the output of said pulse source to said sampling means to control the selective sampling of said analog signal in delayed relationship with respect to the application of said pulse repetition frequency pulses from the source to said first connecting means, a variable delay means in both the second and third connecting means, a time discriminator associated with each of said second and third connecting means, separate selector means joined to said second and third connecting means and responsive to the pulse repetition frequency pulses passing through the respective variable delay means to develop output pulses, means for joining said selector output pulses to their respective associated time discriminators as one input thereto, and means joining the output of said pulse source to said time discriminators as second inputs thereto, and means for joining the output of each time discriminator, developed by comparing its inputs, as a control signal to its respective variable delay means.

7. A dynamic analog memory as set forth in claim 3 wherein said timing means includes a pulse source, a sweep generator, means joining the output of said pulse source to the sweep generator to control the operation thereof, and means joining the output of said sweep generator to said modulating means, said modulating means being operative to compare the amplitudes of the sampled analog signal and the sweep generator output to time modulate said analog signal.

8. A dynamic analog memory as set forth in claim 7 wherein said sweep generator is adjustable to permit its use in a multiplex memory arrangement.

9. A dynamic analog memory as set forth in claim 3 wherein said timing means includes a pulse source, and means joining the output of said pulse source to the third connecting means to control the selective recycle operation.

10. A dynamic analog memory as set forth in claim 9 wherein said third connecting means includes a gating means to which the output of said pulse source is joined to control the recycle operation.

11. A dynamic analog memory as set forth in claim 3 wherein said timing means includes a pulse source, a sweep generator, means joining the output of said pulse source to the sweep generator to control the operation thereof, and means joining the output of said sweep generator to said demodulating means; said demodulating means including first and second gating means, the outputs of each of said gating means being joined as separate inputs to a differential integrator, an amplitude comparator, the output of said integrator being connected as one input to said comparator and the output of said sweep generator being connected as another input to said comparator, the output of said comparator being connected as an input to each of said gating means, delay means joining said second connecting means to a second input of the first gating means, and the second connecting means being joined directly to the second input of the second gating means, said integrator being responsive to an input from said first gating means to integrate in one direction and responsive to an input from the second gating means to integrate in the opposite direction.

12. A dynamic memory as set forth in claim 11 further comprising an initializer connected to sample said analog signal input, additional gating means joining said pulse source to said initializer to control the sampling operation, and means translating the output of said initializer to said integrator to establish a voltage reference level at its output.

13. A dynamic memory as set forth in claim 11 further comprising a point memory joined to the output of the integrator to reproduce the output of the sampling means and filter means connected to the point memory for transforming its output to reproduce the original analog signal.

14. An arrangement for maintaining a constant delay path between an input and an output comprising: a delay line, a first connecting means joining the input to one point on said delay line, a second connecting means joining a second point of the delay line to said output, said second connecting means including a variable delay means, a pulse source joined directly to said first connecting means and a phase shifter joining said pulse source to the first connecting means, said phase shifter being adjusted to deliver pulses to said first connecting means delayed a predetermined interval from pulses directly delivered thereto; a gating means, means joining the output of said variable delay means directly to one input of said gating means, an additional delay line joining the output of the variable delay means to a second input of said gating means, the delay of said additional delay line corresponding to said predetermined interval; a time discriminator, means joining the output of said gating means to one input of said time discriminator, means joining the output of said phase shifter as a second input to said time discriminator, and means joining the output of said time discriminator to said variable delay means to control the adjustment thereof.

References Cited

UNITED STATES PATENTS

| | | | |
|---|---|---|---|
| 3,158,691 | 11/1964 | Brightman | 179—15 |
| 3,164,809 | 1/1965 | Pearce et al. | 340—173 |
| 3,165,721 | 1/1965 | Kennedy et al. | 340—173 |
| 3,183,448 | 5/1965 | Strother et al. | 179—15 |
| 3,299,406 | 1/1967 | Isberg | 340—172.5 |

BERNARD KONICK, *Primary Examiner.*

J. F. BREIMAYER, *Assistant Examiner.*